United States Patent
Chang et al.

(10) Patent No.: US 7,852,354 B2
(45) Date of Patent: Dec. 14, 2010

(54) SYSTEM AND METHOD FOR MERGING IMAGES OF AN OBJECT

(75) Inventors: Chih-Kuang Chang, Taipei Hsien (TW); Xiao-Chao Sun, Shenzhen (CN); Zhong-Kui Yuan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 827 days.

(21) Appl. No.: 11/768,924

(22) Filed: Jun. 27, 2007

(65) Prior Publication Data

US 2008/0136840 A1 Jun. 12, 2008

(30) Foreign Application Priority Data

Dec. 6, 2006 (CN) .......................... 200610157335

(51) Int. Cl.
*G09G 5/00* (2006.01)
(52) U.S. Cl. ...................................... 345/629
(58) Field of Classification Search ........................ None
See application file for complete search history.

(56) References Cited

U.S. PATENT DOCUMENTS

| | | | | |
|---|---|---|---|---|
| 5,586,196 A * | 12/1996 | Sussman | ...................... | 382/114 |
| 6,091,418 A * | 7/2000 | Smith et al. | .................. | 345/418 |
| 6,229,544 B1 * | 5/2001 | Cragun | ....................... | 345/418 |
| 6,483,515 B1 * | 11/2002 | Hanko | ......................... | 345/545 |
| 7,256,799 B2 * | 8/2007 | Hatanaka et al. | ............. | 345/629 |
| 7,317,558 B2 * | 1/2008 | Chiba | ......................... | 358/450 |
| 7,505,162 B2 * | 3/2009 | Tan | ............................ | 358/1.15 |
| 2002/0151283 A1 | 10/2002 | Pallakoff | | |
| 2002/0163530 A1 * | 11/2002 | Takakura et al. | ............. | 345/629 |
| 2003/0058468 A1 * | 3/2003 | Couwenberg et al. | ...... | 358/1.13 |
| 2003/0088561 A1 * | 5/2003 | Yajima et al. | .................. | 707/4 |
| 2005/0206659 A1 * | 9/2005 | Cutler | ......................... | 345/660 |
| 2005/0283989 A1 | 12/2005 | Pettersson | | |
| 2006/0034543 A1 * | 2/2006 | Bacus et al. | ................. | 382/284 |
| 2006/0215038 A1 * | 9/2006 | Gruber et al. | ............. | 348/218.1 |
| 2007/0242077 A1 * | 10/2007 | Danan | ......................... | 345/536 |
| 2010/0020097 A1 * | 1/2010 | Mai et al. | ..................... | 345/629 |

FOREIGN PATENT DOCUMENTS

| | | |
|---|---|---|
| CN | 1533637 A | 9/2004 |
| CN | 2775963 Y | 4/2006 |

* cited by examiner

*Primary Examiner*—Kee M. Tung
*Assistant Examiner*—David H Chu
(74) *Attorney, Agent, or Firm*—Frank R. Niranjan

(57) ABSTRACT

A method for merging images of an object is provided. The method includes the steps of: (a) reading the images in a storage merging all the images to form a logic rectangle rcA, and calculating a reduction scale S of the logic rectangle rcA; (b) calculating a reduction scale S of the logic rectangle rcA; (c) generating a image rcC by reducing the logic rectangle rcA according to the reduction scale S and a coordinate mapping; (d) reading all the pixel rectangles rcB; (e) reducing each of the pixel rectangles rcB according to the reduction scale S to generate an image rcD; and (f) incorporating all the generated images rcD to the image rcC according to the coordinate mapping to form an overall image of the object. A related system is also disclosed.

7 Claims, 8 Drawing Sheets

| Image Name | X Coordinate Value | Y Coordinate Value |
|---|---|---|
| Image1 | 0014 | 0003 |
| Image2 | 0640 | 0000 |
| Image3 | 1280 | 0000 |
| Image4 | 1920 | 0000 |
| Image5 | 0000 | 0480 |
| Image6 | 0640 | 0480 |
| Image7 | 1280 | 0480 |
| Image8 | 1920 | 0480 |
| Image9 | 0000 | 0960 |
| Image10 | 0640 | 0960 |

FIG. 2

SYSTEM AND METHOD FOR MERGING IMAGES OF AN OBJECT

BACKGROUND OF THE INVENTION

1. Field of the Invention

The present invention generally relates to systems and methods for processing images, and more particularly relates to a system and method for merging images of an object.

2. Description of Related Art

CCDs are used in a variety of different imaging devices, such as imagers, CCD cameras or scanners. The CCD is purely a light-sensitive integrated circuit that stores and displays data for an image of an object in such a way that each pixel (picture element) in the image is converted into an electrical charge and the intensity of which is related to a color in the color spectrum. So, an optical lens is required to properly focus the incident radiation from the object onto an array during a process of capturing the images of the object.

The standard CCD can identify a pixel corresponding to the object whose length is about 0.01 millimeter. If the resolution of a computer display is 1024*768 bytes, the image of the object is only displayable up to 10 millimeter in its length. However, when a larger object needs to be measured on a measuring machine, conventionally, this task needs the measuring engineer to additionally control the manual rocker to make a platform of the measuring machine in order to move accurately in horizontal directions for capturing images of the accurate part of the object. However, accurate movement of the object wastes the measuring engineer much time.

To overcome shortcomings of the conventional method, a system and method for merging images of an object is provided, which allows the measuring engineer to capture only continuously of the object and not requires the measuring engineer to move the object accurately for capturing images of accurate parts of the object. In other words, there tend to be some overlaps between each adjacent images. Also, the system and method for merging images of an object is capable of reading all captured images to generate an overall image for measuring so as to improve measuring efficiency and save measurement time.

SUMMARY OF THE INVENTION

A system for merging images of an object is disclosed. The system comprises a computer and a charged coupled device (CCD) for capturing images of the object, the computer comprising a storage for storing the images of the object and a location file; an image merging unit comprising: a logic rectangle generating module configured for reading the images in the storage, obtaining heights and widths of the images, reading coordinate values of the images in the location file, converting the coordinate values to coordinate values measured in pixels, generating a pixel rectangle rcB for each of the images according to the obtained heights and widths, merging all the generated pixel rectangles rcB according to their coordinate values in pixels to form a logic rectangle rcA, and for calculating a reduction scale S of the logic rectangle rcA; and an overall image generating module configured for generating an image rcC by reducing the logic rectangle rcA according to the reduction scale S and a coordinate mapping; reading all the pixel rectangles rcB; reducing each of the pixel rectangles rcB according to the reduction scale S to generate an image rcD; and incorporating all the generated images rcD to the image rcC according to the coordinate mapping to form an overall image of the object.

A method for merging images of an object is disclosed. The method comprises the steps of: (a) reading the images in a storage, obtaining heights and widths of the images, reading coordinate values of the images in a location file, converting the coordinate values to coordinate values measured in pixels, generating a pixel rectangle rcB for each of the images according to the obtained heights and widths, merging all the generated pixel rectangles rcB according to their coordinate values in pixels to form a logic rectangle rcA, and for calculating a reduction scale S of the logic rectangle rcA; (b) calculating a reduction scale S of the logic rectangle rcA; (c) generating a image rcC by reducing the logic rectangle rcA according to the reduction scale S and a coordinate mapping; (d) reading all the pixel rectangles rcB; (e) reducing each of the pixel rectangles rcB according to the reduction scale S to generate an image rcD; and (f) incorporating all the generated images rcD to the image rcC according to the coordinate mapping to form an overall image of the object.

Other advantages and novel features of the embodiments will be drawn from the following detailed description with reference to the attached drawings.

BRIEF DESCRIPTION OF THE DRAWINGS

FIG. 2 is a schematic diagram of a location file;

DETAILED DESCRIPTION OF THE INVENTION

Figure 1:
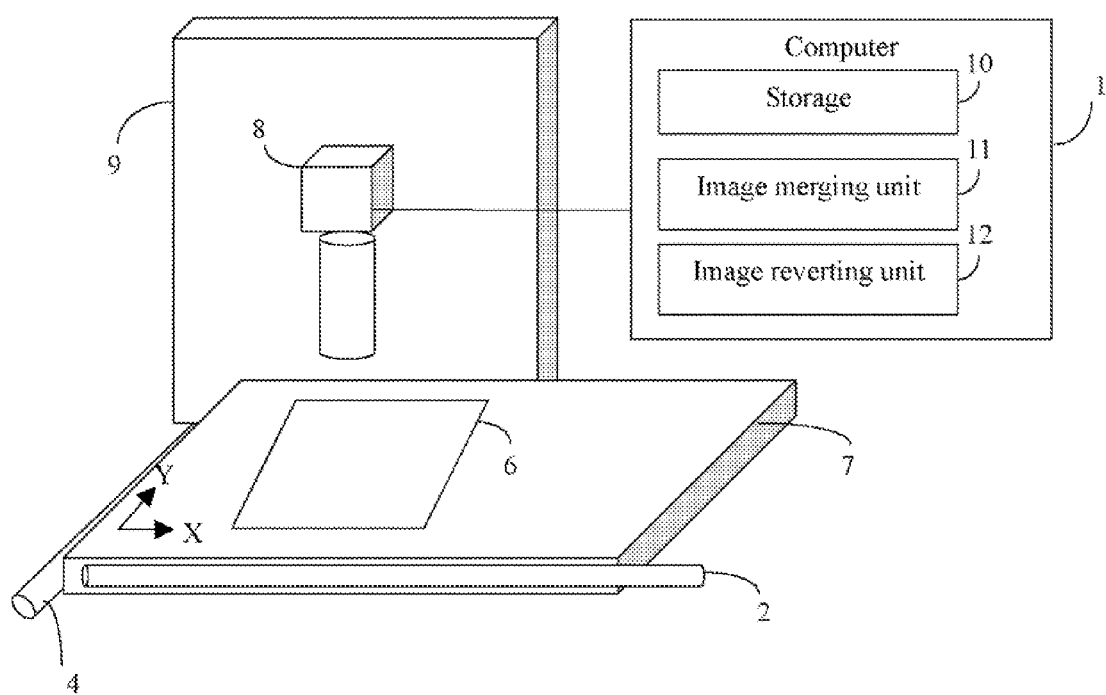
FIG. 1 is a schematic diagram of a system for merging images of an object.

FIG. 1 is a schematic diagram of a system for merging images of an object 6 (hereinafter, "the system") in accordance with a preferred embodiment. The system includes a computer 1 configured to measure an object 6 fixed at a platform 7 of a measuring machine 9. The computer 1 mainly includes a storage 10, an image merging unit 11, and an image reverting unit 12. A charged coupled device (CCD) 8 fixed at a Z-axis of the measuring machine 9 capturing a series of images of the object 6, and records coordinate values of center points of the images when capturing the images. The CCD 8 includes an optical lens that focuses on the object 6 for capturing the series of the images of different parts of the object 6.

The measuring machine 9 includes an X-axis manual rocker 2, a Y-axis manual rocker 4, and a Z-axis manual rocker (not shown). The X-axis manual rocker 2 may control the platform 7 to move in the direction of left and right. The Y-axis manual rocker 4 may control the platform 7 to move in the direction of back and forth. The object 6 then moves along with the platform 7 controlled by the X-axis rocker 2 and the Y-axis rocker 4, in order for the CCD 8 to easily capture images of the object 6 on the platform 7 by focusing on the object 6.

The computer 1 is connected with the CCD 8 via a data line. The CCD 8 transmits all the images and coordinate value of their corresponding images to the storage 10 through the data line. The coordinate values are measured in dimension size. The coordinate values of the images are stored in a location file 3 (as shown in FIG. 2) in the storage 10. Each image is stored as a bitmap (BMP) file. The BMP may be 8 bits, 16 bits, 24 bits or 32 bits. In the preferred embodiment, there are some overlaps between two adjacent images. For example, there are some overlaps between an image named image1 (shown in FIG. 2) and an image named bmp2 (shown in FIG. 2).

BMP is a standard file format for computers running WINDOWS operating system. Since the BMP is a fairly simple file format, its structure is pretty straightforward. In the preferred embodiment, each bitmap file contains: a bitmap-file header and an array of bytes. The bitmap-file header contains information on a type, and a size of the bitmap file. The array of bytes defines bitmap bits. These are actual image data, represented by consecutive rows, or "scan lines", of the bitmap. Each scan line consists of consecutive bytes representing the pixels in the scan line, in left-to-right order, a number of byte of each scan line depends on a number of image color and a horizontal width of the bitmap in pixels. Each of bytes contains the gray value of the pixel correspondingly. That is, the first byte in the array of bytes represents the gray value of the pixel at the bottom-left corner of the BMP file, and the last byte in the array of bytes represents the gray value of the pixel at the top-right corner of the BMP file. The gray values of the pixels in the BMP file are stored in the order of bottom-to-top, and left-to-right.

According to the coordinate values of the images, the image merging unit 11 is configured (i.e., structured and arranged) for merging the images stored in the storage 10 of the images to obtain an overall image which can be viewed in a display entirely. Afterward, a measuring engineer can then select a measuring point for measuring on the overall image.

The image reverting unit 12 is configured for reverting an image the same as the image captured by the CCD 8, which is stored in the storage 10 when the measuring engineer selects the measuring point on the overall image. The measuring engineer can then measure the reverted image.

FIG. 2 is a schematic diagram of the location file 3. The location file 3 may include columns of: image name, X coordinate value and Y coordinate value. For example, the first bitmap's name is "image1", whose coordinate values are (0014, 0003). X coordinate value of the image1 is "0014", and Y coordinate value of the image1 is "0003". The coordinate values are measured in dimension size, such as millimeter. The location file 3 only shows the information of image1 to image10, but not limited to the ten images.

Figure 3:
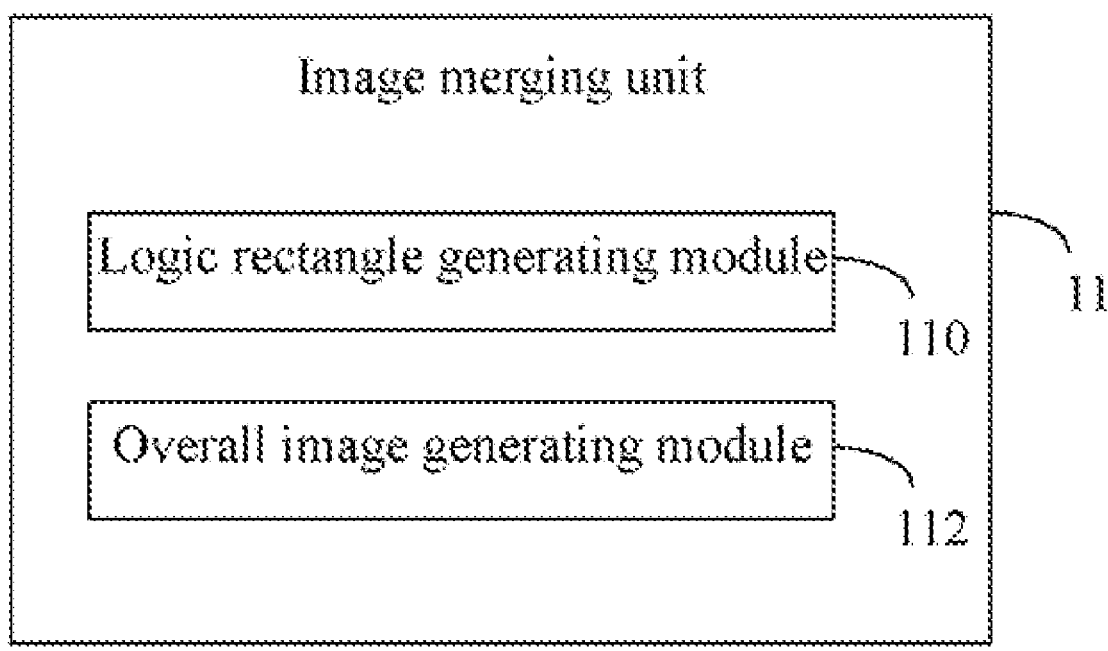
FIG. 3 is a schematic diagram of function modules of an image merging unit of FIG. 1.
Figure 4:
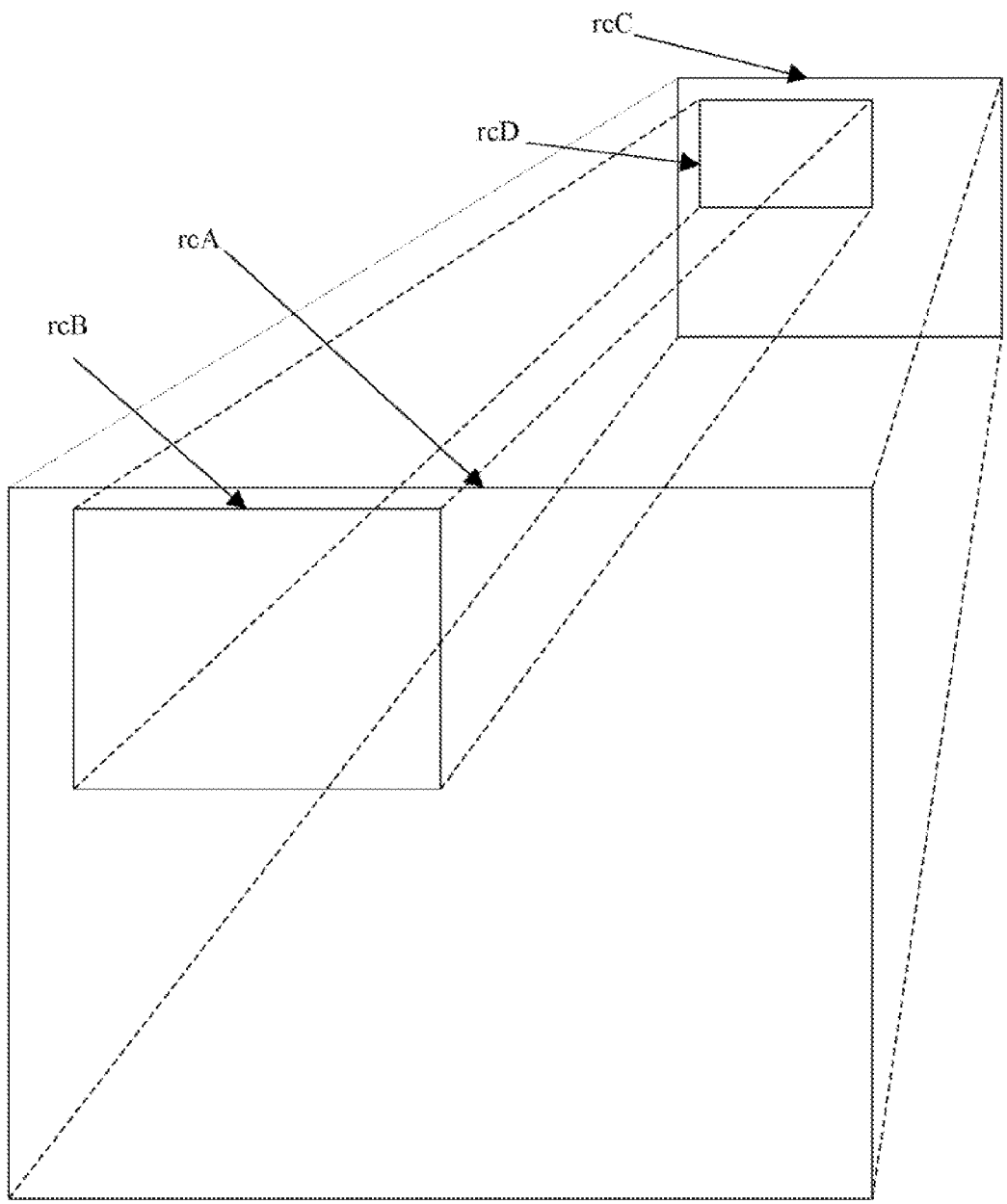
FIG. 4 is a schematic diagram illustrating the approach of coordinate mapping.

FIG. 3 is a schematic diagram of function modules of the image merging unit 11. The image merging unit 11 includes a logic rectangle generating module 110 and an overall image generating module 112. The logic rectangle generating module 110 is configured for reading the images in the storage 10, obtaining heights and widths of the images, reading coordinate values measured in dimension size of the images in the location file 3, converting the coordinate values measured in dimension size to coordinate values measured in pixels, generating a pixel rectangle rcB (shown in FIG. 4) for each of the images according to the obtained heights and widths, merging all the generated pixel rectangles rcB according to their coordinate values in pixels to form a logic rectangle rcA (as shown in FIG. 4), and calculating a reduction scale S of the logic rectangle rcA. If the length of the rcA is E, and the width of the rcA is F, the Length of the rcB is M, and the width of the rcB is N. S equals the greater one between E/M and F/N, that is, if E/M>F/N, S=E/M; otherwise, if E/M<F/N, S=F/N.

The overall image generating module 112 is configured for generating an image rcC (as shown in FIG. 4) by reducing the logic rectangle rcA according to the reduction scale S and a coordinate mapping; reading all the pixel rectangles rcB; reducing each of the pixel rectangles rcB according to the reduction scale S to generate an image rcD; and incorporating all the generated images rcD to the image rcC according to the coordinate mapping to form an overall image of the object. The measuring engineer can select a measuring point on the overall image for measuring. The coordinate mapping set by the measuring engineer contains a mapping between the logic rectangle rcA and the image rcC. The coordinate mapping between each pixel rectangle rcB and each image rcD is the same as the coordinate mapping between the logic rectangle rcA and the image rcC.

FIG. 4 is a schematic diagram illustrating the approach of coordinate mapping. The logic rectangle rcA includes a plurality of the pixel rectangles rcB generated in accordance to the height and width of each image, for example image1~image10. The image rcC is generated by reducing the logic rectangle rcA according to the reduction scale S and the coordinate mapping set by the measuring engineer. The coordinate mapping between each pixel rectangle rcB and each image rcD is the same as the coordinate mapping between the logic rectangle rcA and the image rcC.

Figure 5:
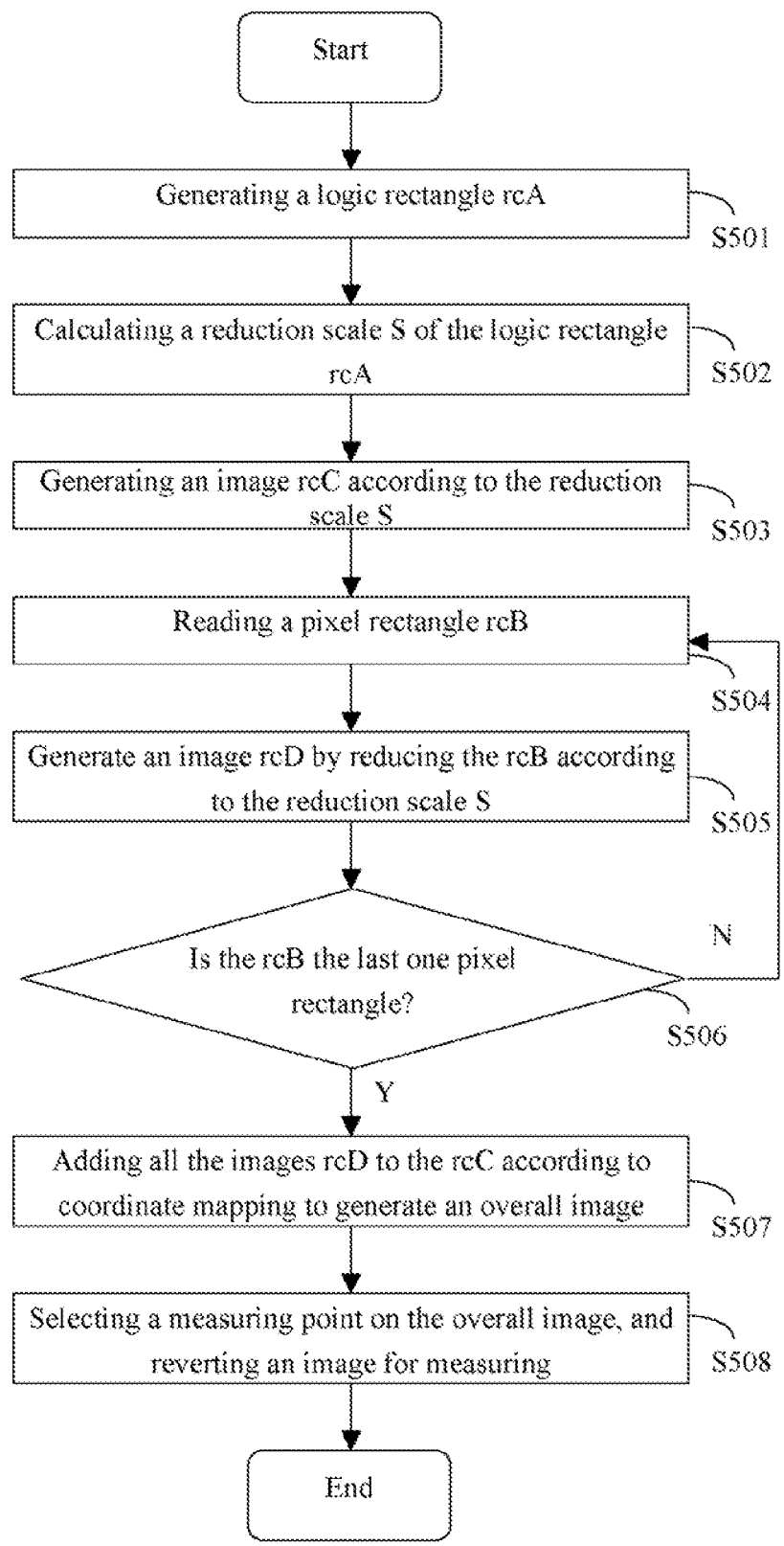
FIG. 5 is a flow chart of a preferred method for merging images of an object by implementing the system of FIG. 1.

FIG. 5 is flowchart of a preferred method for merging images of an object by utilizing the system of FIG. 1. In step S501, the logic rectangle generating module 110 reads the images in the storage 10, obtains heights and widths of the images, reads coordinate values measured in dimension size of the images in the location file 3, converts the coordinate values measured in dimension size to coordinate values measured in pixels, generates a pixel rectangle rcB for each of the images according to the obtained heights and widths, and merges all the generated pixel rectangles rcB according to their coordinate values in pixels to form a logic rectangle rcA. The Length of the rcA is E, and the width of the rcA is F. The Length of each rcB is M, and the width of the rcB is N. In step S502, the logic rectangle generating module 112 calculates a reduction scale S of the logic rectangle rcA. The reduction scale S equals the greater one of E/M and F/N, that is, if E/M>F/N, S=E/M; otherwise, if E/M<F/N, S=F/N. In step S503, the overall image generating module 112 generating an image rcC according to the reduction scale S and the coordinate mapping set by the measuring engineer.

In step S504, the overall image generating module 112 reads a pixel rectangle rcB. In step S505, the overall image generating module 112 generates an image rcD by reducing the pixel rectangle rcB according to the reduction scale S. In step S506, the overall image generating module 112 determines whether the pixel rectangle rcB is the last pixel rectangle. If the rcB is not the last pixel rectangle, the procedure returns to step S504. Otherwise, in step S507, the overall image generating module 112 adds all the images rcD to the image rcC according to the coordinate mapping set by the measuring engineer to generate an overall image. In step S508, after the measuring engineer selects a measuring point needing to be measured on the overall image, the image reverting unit 12 reverts an image the same as the image captured by the CCD 8 for measuring.

Figure 6:
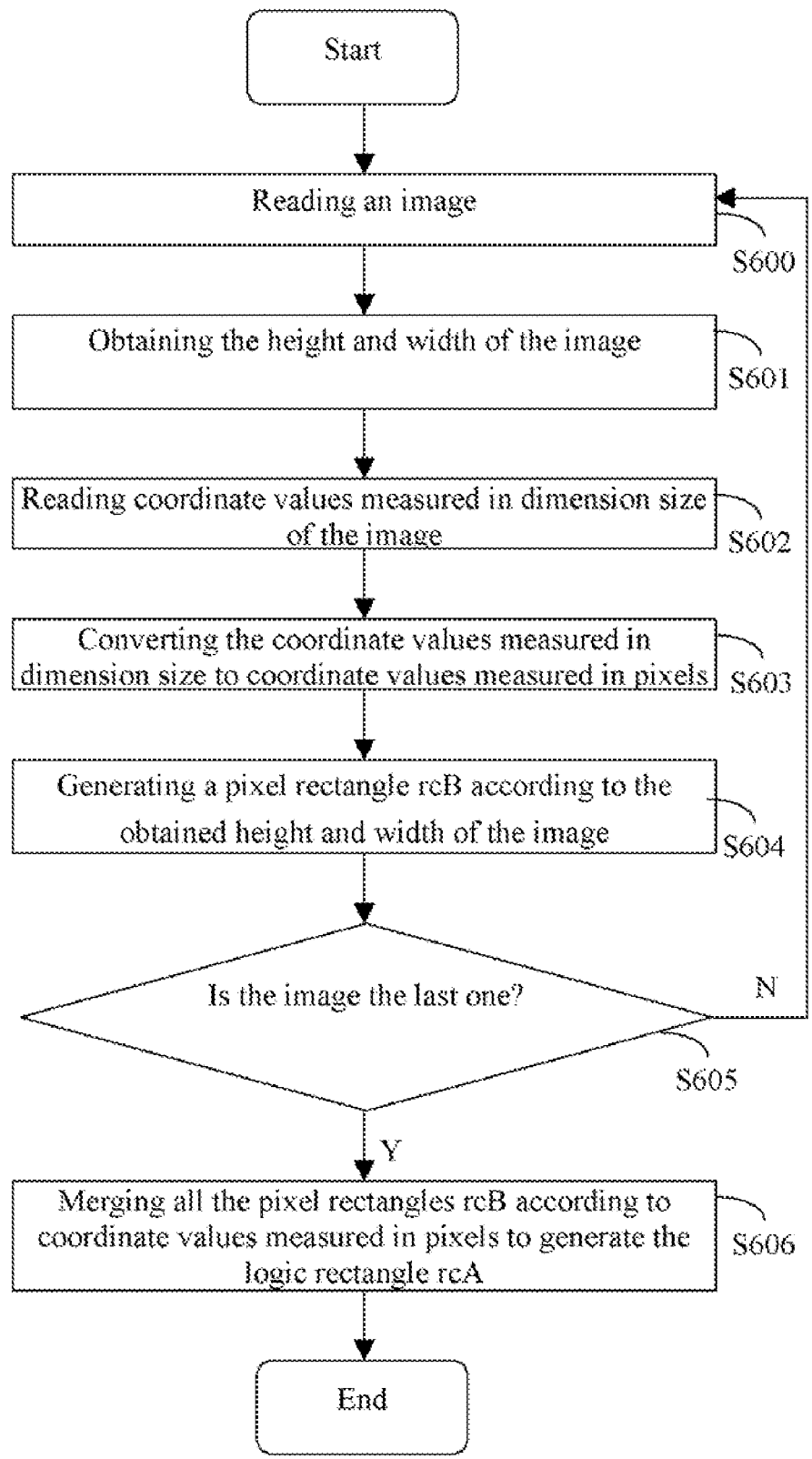
FIG. 6 is a flow chart illustrating the detail of step S501 in FIG. 5, namely generating a logic rectangle rcA.

FIG. 6 is a flowchart illustrating the detail of step S501 of FIG. 5, namely generating the logic rectangle rcA. In step S600, logic rectangle generating module 110 reads an image, such as the image1. In step S601, the logic rectangle generating module 110 obtains the height and width of the image named image1. The height and width are measured in pixels. In step S602, the logic rectangle generating module 110 reads the coordinate values of the image1 in the location file 3. The coordinate values of the image1 are (0014, 0003), which are measured in dimension size, such as millimeter. In step S603, the logic rectangle generating module 110 converts the coordinate values (0014, 0003) measured in dimension size to coordinate values measured in pixels. In step S604, the logic rectangle generating module 110 generates the pixel rectangle rcB according to the height and width of the image1. In step S605, the logic rectangle generating module 110 determines whether the image1 is the last image. If the image1 is not the last image, the procedure returns to step S600. If the image1 is the last image in step S606, the logic rectangle generating module 110 will merges all the pixel rectangles rcB according to the coordinate values measured in pixels to form the logic rectangle rcA. The logic rectangle rcA is the minimum one of rectangles which include all the pixel rectangles rcB.

Figure 7:
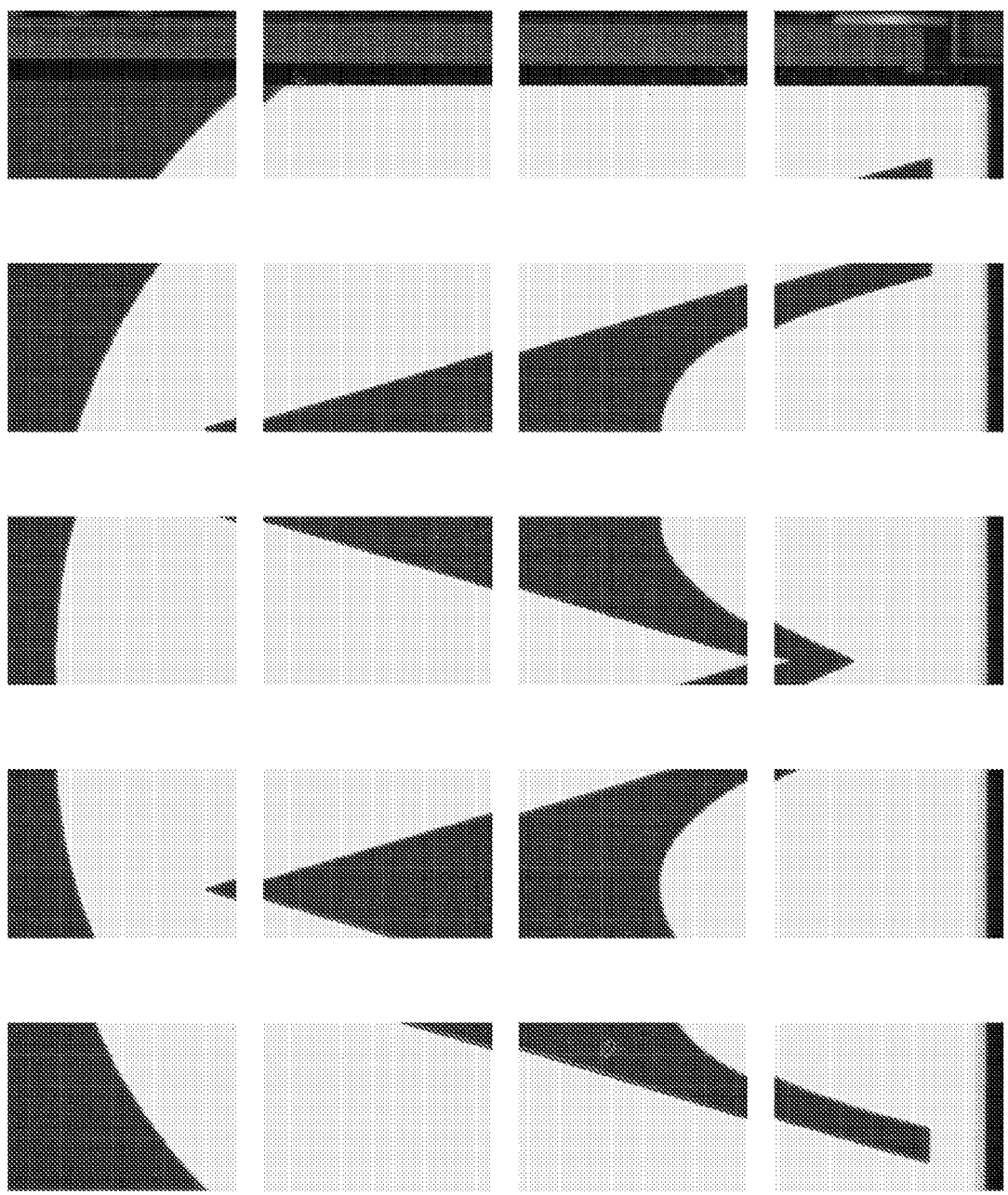
FIG. 7 is a schematic diagram of images of an object.

FIG. 7 is a schematic diagram of the images of the object 6 captured by the CCD 8 from the platform 7 of the measuring machine 9. The object 6 moves along with the platform 7 of the measuring machine 9 controlled by the X-axis rocker 2 and the Y-axis rocker 4. The object moves along with the platform 7 in the horizontal direction. The CCD 8 captures twenty images and records their corresponding coordinate values of center point of each image. The coordinate values are measured in dimension size, such as millimeter.

Figure 8:
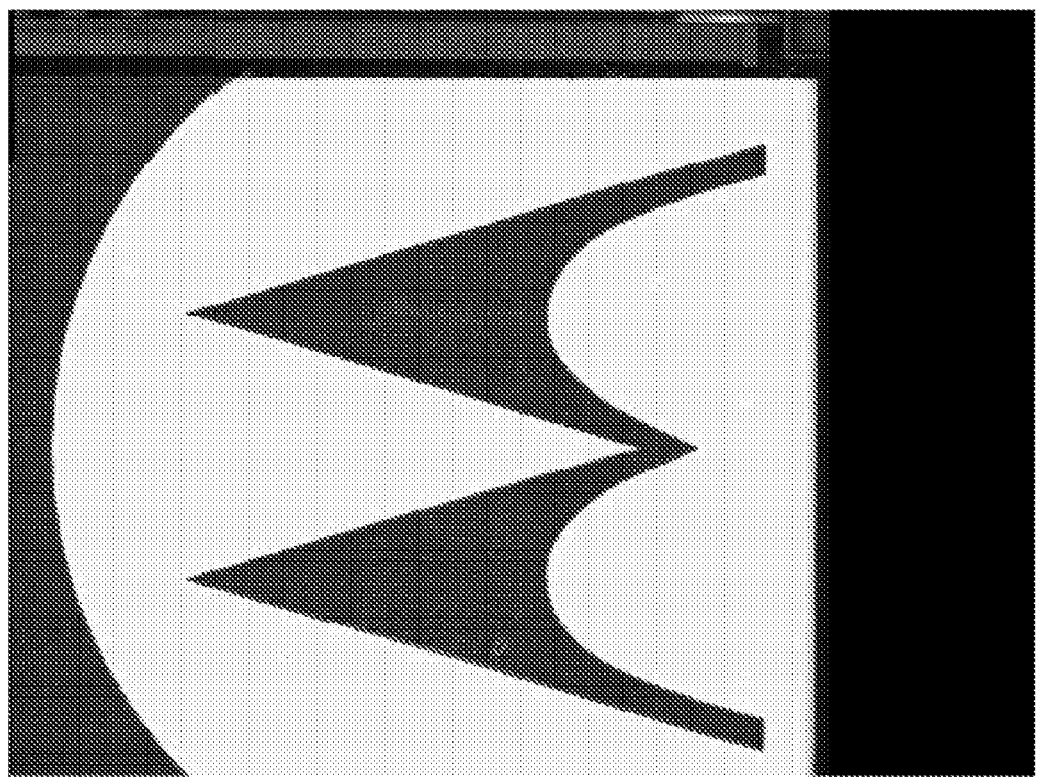
FIG. 8 is a schematic diagram of an overall image by merging the images of the object of FIG. 7.

FIG. 8 is a schematic diagram of the overall image by merging the images of FIG. 7 by utilizing the system and method for merging images of the object. The overall image can be viewed entirely in a display view. When the measuring engineer selects one measuring point on the overall image for measuring, the image reverting unit 12 reverts an image the same as the image captured by the CCD 8 for measuring.

It should be emphasized that the above-described embodiments, particularly, any "preferred" embodiments, are merely possible examples of implementations, and merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure, and the present invention is protected by the following claims.

What is claimed is:

1. A system for merging images of an object, comprising a computer and a charged coupled device (CCD) for capturing images of the object, the computer comprising:
   a storage for storing images of different parts of the object and a location file which contains coordinate values of the images;
   an image merging unit comprising:
   a logic rectangle generating module configured for reading the images in the storage, obtaining heights and widths of the images, reading coordinate values of the images in the location file, converting the coordinate values to coordinate values measured in pixels, generating a pixel rectangle rcB for each of the images according to the obtained heights and widths, merging all the generated pixel rectangles rcB according to their coordinate values in pixels to form a logic rectangle rcA, and for calculating a reduction scale S of the logic rectangle rcA, wherein the reduction scale S is the greater one of length of the rcA/length of the rcB and width of the rcA/width of the rcB; and
   an overall image generating module configured for generating an image rcC by reducing the logic rectangle rcA according to the reduction scale S and a coordinate mapping; reading all the pixel rectangles rcB; reducing each of the pixel rectangles rcB according to the reduction scale S to generate an image rcD; and incorporating all the generated images rcD to the image rcC according to the coordinate mapping to form an overall image of the object.

2. The system according to claim 1, wherein the coordinate mapping is a mapping between the logic rectangle rcA and the image rcC.

3. The system according to claim 1, wherein the images are stored in bitmap file format.

4. The system according to claim 1, wherein the location file comprises columns of: image name, X coordinate value, and Y coordinate value.

5. A computer-based method for merging images of an object, the method comprising the steps of:
   (a) reading the images in a storage, obtaining heights and widths of the images, reading coordinate values of the images in a location file which contains coordinate values of the images, converting the coordinate values to coordinate values measured in pixels, generating a pixel rectangle rcB for each of the images according to the obtained heights and widths, merging all the generated pixel rectangles rcB according to their coordinate values in pixels to form a logic rectangle rcA, and for calculating a reduction scale S of the logic rectangle rcA;
   (b) calculating a reduction scale S of the logic rectangle rcA;
   (c) generating a image rcC by reducing the logic rectangle rcA according to the reduction scale S and a coordinate mapping;
   (d) reading all the pixel rectangles rcB;
   (e) reducing each of the pixel rectangles rcB according to the reduction scale S to generate an image rcD, wherein the reduction scale S is the greater one of length of the rcA/length of the rcB and width of the rcA/width of the rcB; and
   (f) incorporating all the generated images rcD to the image rcC according to the coordinate mapping to form an overall image of the object.

6. The method according to claim 5, wherein the images are stored in bitmap file format.

7. The method according to claim 5, wherein the location file comprises such columns of: image name, X coordinate value and Y coordinate value.

* * * * *